Oct. 31, 1961  W. M. ZOLEZZI ET AL  3,006,766
METHOD OF PREPARING A BREAST OF CHICKEN PRODUCT
Filed March 8, 1960  4 Sheets-Sheet 1
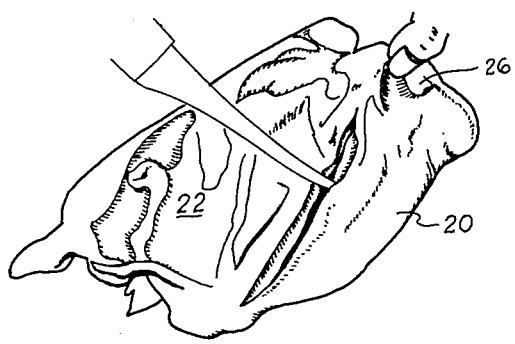
Fig_1
Fig_2
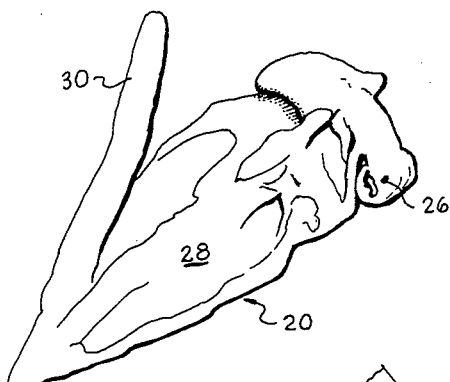
Fig_3
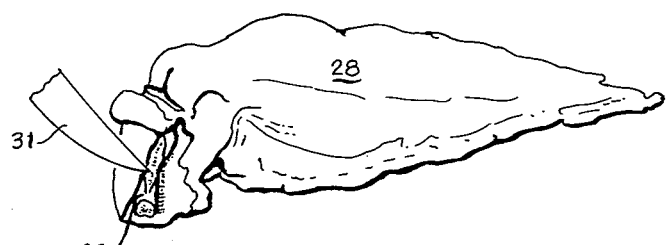
Fig_5
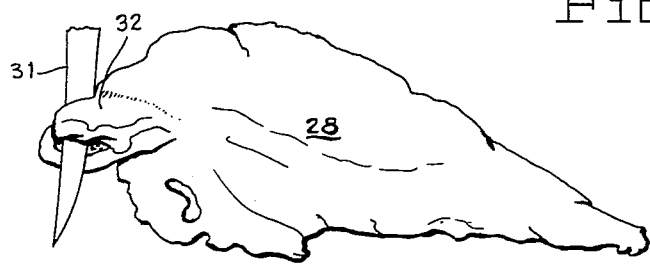
Fig_4
INVENTOR.
WALTER M. ZOLEZZI
MILTON L. BRANDT
BY
Eckhoff and Slick
ATTORNEYS

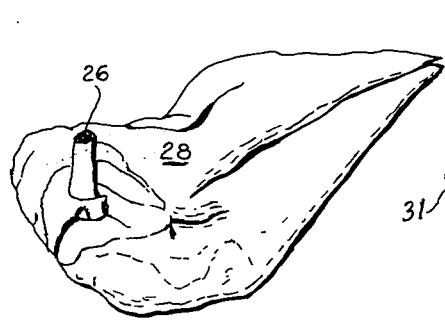
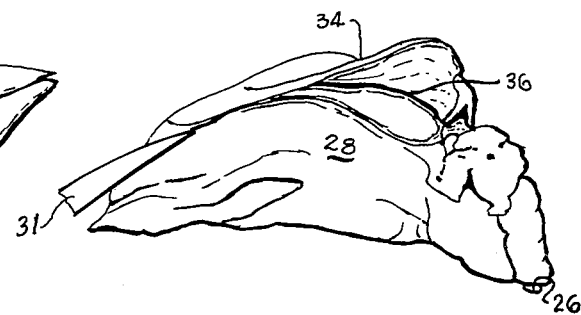
Fig_6  Fig_7
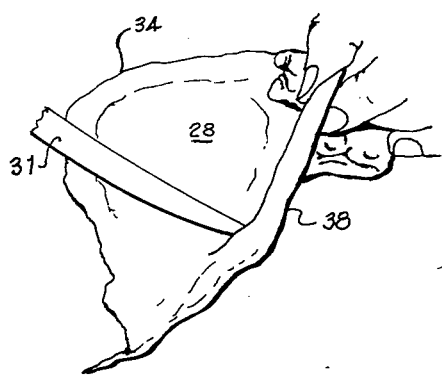
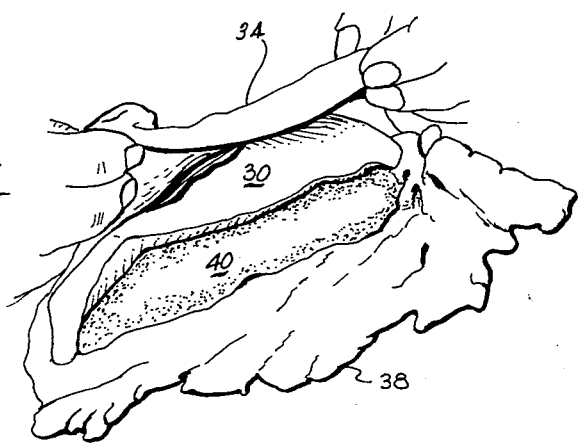
Fig_8  Fig_9
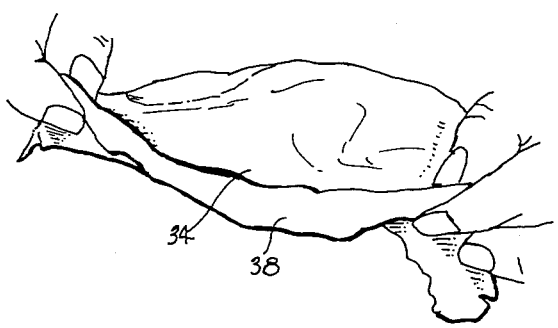
Fig_10

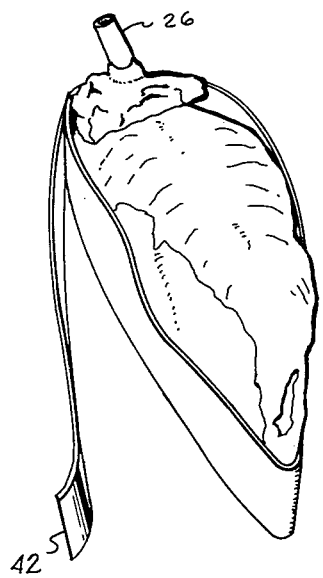
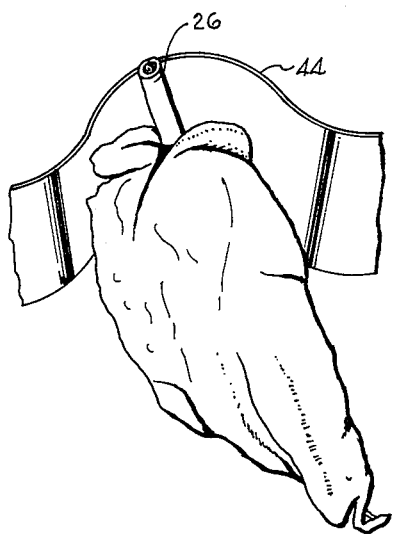
Fig_11    Fig_12
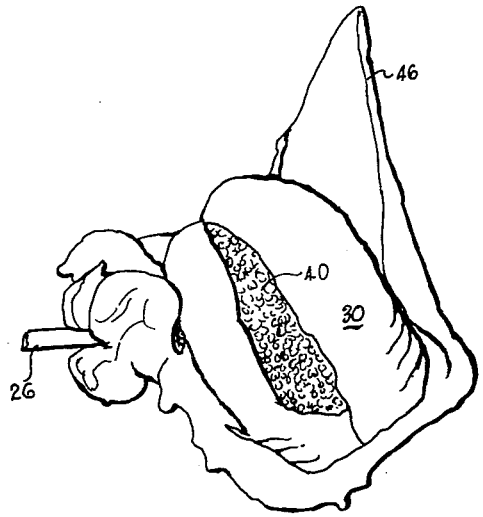
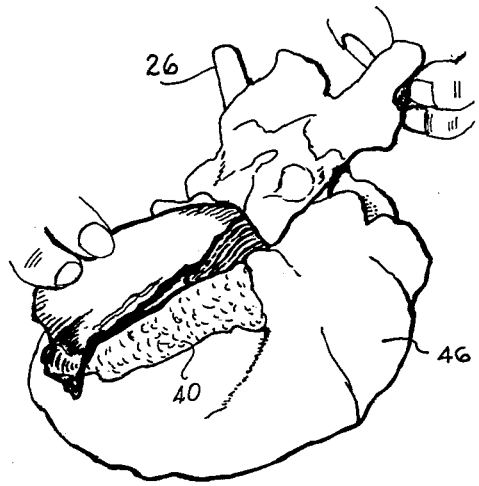
Fig_13    Fig_14

Oct. 31, 1961  W. M. ZOLEZZI ET AL  3,006,766
METHOD OF PREPARING A BREAST OF CHICKEN PRODUCT
Filed March 8, 1960  4 Sheets-Sheet 4
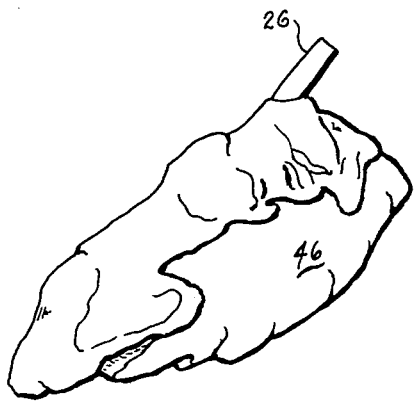
Fig_15
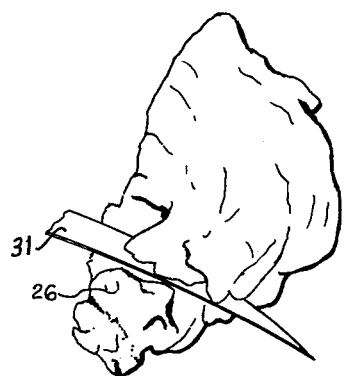
Fig_16
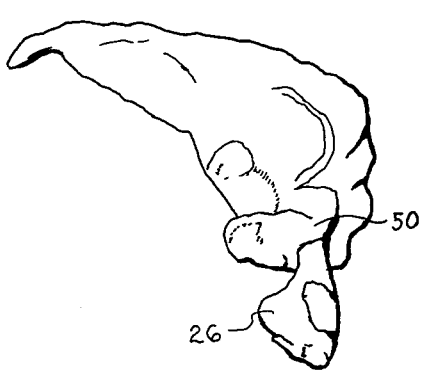
Fig_17
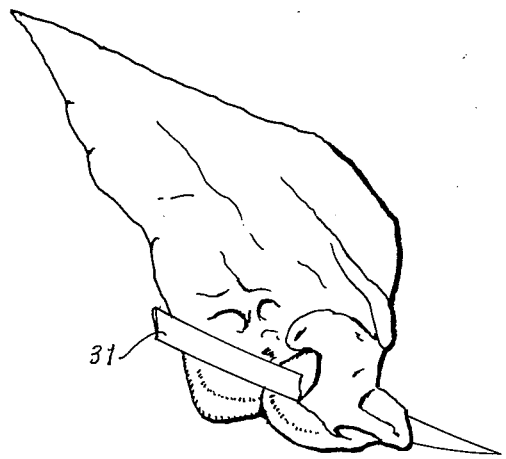
Fig_18
INVENTOR.
WALTER M. ZOLEZZI
BY MILTON L. BRANDT
Eckhoff and Slick
ATTORNEYS

United States Patent Office 3,006,766
Patented Oct. 31, 1961

3,006,766
METHOD OF PREPARING A BREAST OF CHICKEN PRODUCT
Walter M. Zolezzi, San Francisco, and Milton L. Brandt, San Mateo, Calif., assignors to O'Brien, Spotorno, Mitchell & Compagno Bros., Inc., a corporation of California
Filed Mar. 8, 1960, Ser. No. 13,594
10 Claims. (Cl. 99—107)

This invention relates to a breast of chicken product and more particularly to a method of forming stuffed boneless breasts of chicken and preparing them for cooking.

It is an object of this invention to provide a stuffed boneless breast of chicken product.

It is a further object of this invention to provide a method of forming a stuffed boneless breast of chicken which results in a product which may or may not have the humerus left attached thereto and which is suitable for freezing so as to form a stuffed boneless breast of chicken product which may be readily cooked without additional preparation.

Still another object of this invention is to provide a method of overlapping and locking different breast of chicken muscles so that a stuffing material may be retained within and a self-sustaining product of considerable cross-section and depth is obtained.

In the drawings:

FIGURES 1 through 10 are perspective views illustrating the sequence of steps in the method;

FIGURE 11 is a perspective view showing the step of encircling a portion of the product with kraft paper impregnated with oil, hereinafter referred to as "oil paper," so as to cause the humerus to stand upright and so as to cause the stuffed breast to maintain a high degree of plumpness;

FIGURE 12 shows an alternate method for preparing the product for freezing whereby the humerus remains upright;

FIGURES 13 through 15 shows sequential steps in an alternate method for preparing the product for freezing whereby the humerus remains upright; and FIGURES 16 through 18 show a portion of an alternate procedure whereby the humerus bone is entirely removed from the superficial pectoral muscle.

Generally, this invention comprises a method for preparing a breast of chicken product wherein the superficial and deep pectoral muscles are separated from the carcass and the breast meat entirely removed from the carcass. In the preferred embodiment, about two-thirds of each humerus bone is left attached to each of the breast meat portions. The two breast portions are separated and the superficial and deep pectoral muscles separated one from the other so as to form four separte meat sections. The operator slits the periosteum along the entire length of the remaining humerus bone and peels the muscle tissue and the periosteum back to about the epiphysis. The operator then partially severs the uppermost layer of the superficial pectoral muscle from the main portion thereof beginning along a line extending from the articular surface of the humerus to the opposite end of the pectoral muscle. The cut extends from this line toward the longitudinal edges of the superficial pectoral muscle and extends parallel to the surface of the muscle, leaving only a hinge of meat joining each of the two flaps so formed to the main portion of the superficial pectoral muscle. The flaps are opened to form a slab of meat of increased size and the size is further increased by a pounding operation. The deep pectoral muscle is also extended by pounding, the stuffing material is placed at the center of the large slab and the deep pectoral muscle is placed thereover. The available flaps of meat are then wrapped about the stuffing and the product frozen or cooked immediately. Means are also provided for insuring that the remaining portion of the humerus bone stands upright.

In the variation partially shown in FIGURES 16 through 18, the humerus is removed prior to the step wherein the stuffing material is wrapped with the meat.

At the outset, the chicken, after evisceration, must be subjected to conventional preliminary butchering to remove the legs and separate the skin (if desired). It may be desired to retain the skin if a "skin-on" product is desired. Each side of the breast is boned in one piece, leaving the proximal one-half/two-thirds of each humerus remaining. Boning may be accomplished in a conventional fashion with each chicken lying either on its side or breast up in front of the boning butcher. Also, the boning may be accomplished by suspending the chicken vertically from a shackle on an automatic overhead conveyor, using air inflation when a "skin-off" breast product is desired, as a means of separating the skin from the breast meat.

FIGURES 1 and 2 show the boning of the breast, which is accomplished by cutting through the articulation of the humerus and the shoulder girdle. The superficial and deep pectoral muscles are removed together, leaving the shoulder girdle intact with the carcass. As shown in FIGURES 1 and 2, this is accomplished in two separate stages, the right breast 20 being freed from the carcass 22 in FIGURE 1 and the left breast 24 being freed from the carcass in FIGURE 2. The unitary breast portion so formed is then divided in the middle so as to yield two separate boneless breast portions, one of which is shown in FIGURE 3. In performing the process of this invention, the operator separates the superficial pectoral muscle 28 of each boneless half-breast of chicken from the deep pectoral muscle 30. As shown in FIGURE 4, the operator now places each superficial pectoral muscle before him with the remaining portion, preferably two-thirds, of the humerus 26 to one side. The operator then cuts the muscle covering the humerus, as shown in FIGURE 4, with the knife 31, slits the periosteum 32 by running the point of the knife the length of the bone, as shown in FIGURE 5, and peels back the periosteum and the attached muscle tissue approximately to the epiphysis. See FIGURE 5. In this manner, the complete humerus is exposed.

The above procedure for exposing the humerus represents a substantial improvement over practices wherein the muscle tissue of the humerus is simply pushed back without slitting and peeling the periosteum. The improved method described above results in a clean bone, as seen in FIGURE 6, since no membrane is left attached to the humerus.

After the fibrous membrane and fat along the edges of the superficial pectoral muscle have been removed, the superficial pectoral muscle is turned over from the position shown in FIGURES 4 and 5 so that the medial side is up. A knife is inserted into the center of this section. The operator penetrates the breast meat beginning at the point where the articular surface of the humerus is located. The knife is moved so that a flap 34, partially severed from the top of the superficial pectoral muscle, is obtained, only "hinge" 36 remaining along the one longitudinal edge of the superficial pectoral muscle to keep the flap which has been thus created from being freed completely. The operator next places a knife at the center of the pectoral muscle adjacent the articular surface of the humerus once again. This time, the blade is pointed in the opposite direction, as shown in FIGURE 8, so that a second flap 38 is formed opposite flap 34 and secured to the main portion of the superficial pectoral muscle by means of a hinge similar to hinge 36.

When the two flaps 34 and 38 are folded open in the manner of opening a pair of French doors, a roughly dimond-shaped slab of tissue about 8 inches in length and 4 inches wide is formed. To indicate how much this operation widens the area of the breast, superficial pectoral muscles being, before the aforementioned butchering operation, between 7 and 8 inches long, between 2½ and 2¾ inches wide and 12/32 of an inch thick, become, after the operation, between 3¾ and 4 inches wide, and 9/32 of an inch thick at the point of maximum thickness adjacent the point of articulation of the humerus, while remaining between 7 and 8 inches long. Irrespective of the size of the superficial pectoral muscle, the increase in total area will fall between 45 and 66 percent.

The opened pectoral muscles, both right and left, are laid out on a table before the operator, who then dips a meat tenderizing hammer of conventional design and weighing about 1½ pounds, with a waffle-type aluminum head, into water and pounds each of the superficial pectoral muscles so as to increase the area covered. By virtue of the pounding operation, the surface area of the severed muscle is extended 45 to 75 percent so that the width becomes 6 to 7 inches and the thickness, at the point of maximum thickness, 4/32 inch. The operator first pounds the center of the superficial pectoral muscle from top to bottom, and then gradually moves the hammer first to one side and then to the other. It has been found that somewhere between 20 and 25 blows will be sufficient to extend satisfactorily the opened superficial pectoral muscle.

The deep pectoral muscle is similarly treated to increase the surface area between 60 and 100 percent. The length of the muscle remains the same after pounding (6–8 inches) but the initial width of 1 to 1¼ inches is increased to 2 to 2¼ inches and the thickness, initially about 8/32 inch maximum, is decreased to about 4/32 inch.

At this point, the individual slabs of meat are ready to be assembled about stuffing material, and the steps to be described below enable the consistent retention of the stuffing within the breast of the chicken. It is generally recognized that care must be exercised in performing wrapping operations, since there is a natural tendency in the meat to pull back about the edges thereof during cooking, thus permitting the stuffing to drop out of the breast. Such tendency is eliminated here because of the use of both cutting and pounding to extend the area covered and to extend the overlapping of meat areas, rather than just pounding alone, as is conventional. Because the meat which is wrapped about the stuffing initially is in the form of a solid thin slab, results superior to simply cutting a slit, forming a pocket and inserting the stuffing thereinto are obtained. A slit of the conventional type will tear as the stuffing is forced into the pocket. Thus, part of this dressing often escapes either at the point of the slit opening or at points where the pocket terminates.

The stuffing and assembly operation is as follows: As shown in FIGURE 9, a quantity of stuffing material 40 is placed at the center of the superficial pectoral muscle, the stuffing being of any desired shape, e.g. cylindrical, conical, square, triangular, hemispherical, etc., and the deep pectoral muscle 30 is rested on the top of the stuffing material. The operator grips a longitudinal edge 34 of the superficial pectoral muscle 28 and lifts it up around the stuffing and over the deep pectoral muscle 30. The opposite edge 38 is then wrapped about the material at the center so that it overlays flap 34, as shown in FIGURE 10. The operator then spreads the wing meat down along the sides of the breast and smooths the breast so as to form a product having a point, as shown in FIGURES 11 and 12.

At this stage, two alternative steps are possible, as depicted in FIGURES 11 and 12. As shown in FIGURE 11, the operator may encircle the product with a strip of oil paper 42. This limits flattening during cooking and retains the humerus upright. As an alternative, a length of corrugated iron 44 or other suitable backstop may be used for retaining the humerus 26 in an upright position. Conveniently, the corrugated iron rests in a tray, which immediately is placed in the freezer so that the humerus is frozen in this position. In fact, there is a third alternative if it is not desired to form a product having the remaining portion of the humerus upstanding. This third alternative comprises simply freezing or immediately using the product as shown partially completed in FIGURE 10.

As shown in FIGURES 13 through 15, it is also possible to position the stuffing material so that it is generally perpendicular to the humerus, the meat used, being of course, the pounded superficial pectoral muscle described earlier. Specifically, the stuffing is positioned about 1 inch below the point where the articular surface of the humerus is located. The deep pectoral muscle 30 is placed on top of the stuffing and the posterior tip of the breast 46 is brought up and over the deep pectoral muscle. The corners adjacent the humerus 26 are also brought up and over, as shown in FIGURE 14, so that the entire quantity of stuffing and deep pectoral muscle is covered. The longitudinal edges of the superficial pectoral muscle are also wrapped about the stuffing to some degree and the humerus is positioned at the center of the breast at a 45° angle thereto as shown in FIGURE 15. The operator spreads the wing meat down along the sides of the breast and smooths the breast to a point at either end. The product may then be frozen.

Where the skin is left on the breast, two inches of the posterior tip of the skin of the breast is cut off just before the medial side of the superficial pectoral muscle is severed. This is so that skin will not be wrapped beneath the meat adjacent the humerus 26. The "skin-on" product is then wrapped with oil paper in the manner shown in FIGURE 11 and the product is frozen.

It will be noted that a distinction has been made throughout between the method of treatment of "skin-on" and "skin-off" products. Where the skin is retained the product generally is not to be breaded and thus it is necessary that the oil paper be used to retain the stuffed product in the desired form during cooking. Where the skin has been removed, however, the paper generally is unnecessary since the product will be breaded and this will provide means for retaining it in the desired shape until served. Obviously, however, it would be possible to encircle a "skin-off" product with oil paper or to use means other than oil paper, as, for example, the conventional breading, to retain the "skin-on" product in the proper shape throughout the cooking.

Still a further variation wherein the humerus is removed and the product prepared otherwise in susbtantially the fashion described previously may be seen in FIGURES 16 through 18. After the unitary breast portion is divided in the middle so as to yield two separate boneless breast portions, one of which is shown in FIGURE 3, the operator grips the superficial pectoral muscle near the articular surface of the humerous 26 in one hand, and with his knife severs the tendons just below the articular surface of the humerus as shown in FIGURE 16. He then grips the articular surface of the humerus and pulls the humerus 26 away from its accompanying music tissue 50 as shown in FIGURE 17. The knife blade is then inserted into the area from which the humerus was removed and the muscle tissue is severed, as shown in FIGURE 18, permitting the muscle tissue to lay out flat, and to be later used for wrapping purposes.

The stuffing and assembly operation when employing this breast with the humerus removed is exactly the same as described above except that the severed muscle tissue is, after the breast is stuffed, folded around the bottom of the breast. The two flaps 34 and 38 are formed, as described earlier, and pounded so as to form a slab of maximum surface area.

Obviously, many modifications and variations may be

We claim:

1. A method of preparing a breast of chicken product comprising: separating the superficial and deep pectoral muscle from the carcass and removing said muscles therefrom; separating the superficial and deep pectoral muscles one from another; partially severing the uppermost layer of said pectoral muscle from the main portion thereof, the planes of severance extending parallel to the surface of the said muscle and in opposite directions toward the longitudinal edges of said pectoral muscle and retaining hinges of meat joining said main portion to the two flaps formed from the uppermost layer by said severing operation; opening said flaps so as to form a generally diamond-shaped slab of breast meat; expanding the said slab by pounding the upper surface thereof; placing stuffing material at the center of the expanded slab of breast meat so formed; placing a slab of deep pectoral muscle over said stuffing material and wrapping the superficial pectoral muscle tissue thereabout.

2. The method of claim 1 wherein the humerus bone is entirely separated from the said superficial pectoral muscle at the articular surface of the humerus prior to the operation wherein the said two flaps are formed whereby to produce an entirely boneless product.

3. The method of claim 1 wherein about two-thirds of the humerus bone is retained attached to said superficial pectoral muscle and wherein said stuffing material is wrapped so that the humerus is exposed generally at the top of the product so formed.

4. A method of preparing a breast of chicken product comprising: separating the superficial and deep pectoral muscles from the carcass and removing said muscles therefrom while retaining about two-thirds of the humerus bone attached to said superficial pectoral muscle; separating the superficial and deep pectoral muscles one from the other; forcing the muscle tissue surrounding the humerus away from the end thereof whereby to expose said humerus to about the epiphysis; partially severing the uppermost layer of said pectoral muscle from the main portion thereof beginning along a line extending from the point of articulation of said humerus to the opposite end of the said pectoral muscle, the planes of severance extending parallel to the surface of the said muscle and toward the longitudinal edges of said pectoral muscle; retaining hinges of meat joining said main portion to the two flaps formed from the uppermost layer by said severing operation; opening said flaps so as to form a generally diamond-shaped slab of breast meat; expanding the said slab by pounding the upper surface thereof; placing stuffing material at the center of the expanded slab of breast meat so formed; placing a slab of deep pectoral muscle over said stuffing material; and wrapping the superficial pectoral muscle tissue thereabout.

5. A method of preparing a breast of chicken product comprising: separating the superficial and deep pectoral muscles from the carcass and removing the breast meat therefrom, about two-thirds of each humerus bone being retained attached to each breast portion; separating the unitary breast mass along the medial dividing line so as to yield two separate breast portions; separating the superficial and deep pectoral muscles of each breast portion one from another; splitting the periosteum about each humerus bone and the muscle tissue exterior to said periosteum and peeling back the said muscle and periosteum to about the epiphysis; partially severing the uppermost layer of each pectoral muscle from the main portion thereof beginning along a line extending from the point of articulation of the humerus to the opposite end of each pectoral muscle, the plane of severance extending parallel to the surface of said muscle and toward the longitudinal edges of the said pectoral muscles; retaining a hinge of meat securing said main portions to each of the pair of flaps so formed; opening said flaps so as to form a generally diamond-shaped product from said superficial pectoral muscle; expanding the said diamond-shaped product by pounding the surface thereof; expanding the deep pectoral muscle by pounding the surface thereof; placing stuffing material generally at the center of said superficial pectoral muscle product; placing the deep pectoral muscle over said stuffing material; and wrapping said superficial pectoral muscle tissue thereabout.

6. The process of claim 5 wherein a strip of flexible material is wrapped about the stuffing-containing product whereby to retain the humerus bone in an upright position and the product frozen.

7. The process of claim 5 wherein a strip of oil paper is wrapped about the stuffing-containing product whereby to retain said humerus in an upright position.

8. A method of preparing a breast of chicken product comprising: separating the superficial and deep pectoral muscle from the carcass; partially severing the uppermost layer of said superficial pectoral muscle from the main portion thereof beginning along a line extending parallel to said deep pectoral muscle, the planes of severance extending parallel to the surface of the said superficial muscle and in opposite directions from said line toward the longitudinal edges of said superficial pectoral muscle and retaining hinges of meat joining said main portion to the two flaps formed from the uppermost layer by said severing operation; opening the said flaps so as to form a generally diamond-shaped slab of breast meat; expanding the said slab by pounding the surface thereof; placing stuffing material at the center of the expanded slab of breast meat so formed; and wrapping the said flaps of superficial pectoral muscle tissue thereabout.

9. The method of claim 8 wherein the humerus bone is entirely separated from the said superficial pectoral muscle at the articular surface of the humerus prior to the operation wherein the said two flaps are formed whereby to produce an entirely boneless product.

10. The method of claim 8 wherein about two-thirds of the humerus bone is retained attached to said superficial pectoral muscle and wherein said stuffing material is wrapped so that the humerus is exposed generally at the top of the product so formed.

References Cited in the file of this patent

UNITED STATES PATENTS

| | | |
|---|---|---|
| 2,640,779 | George | June 2, 1953 |
| 2,844,844 | Sieczkiewicz | July 29, 1958 |
| 2,916,381 | Jumenko | Dec. 8, 1959 |
| 2,922,718 | Saverslak | Jan. 26, 1960 |